(12) United States Patent
Maconochie

(10) Patent No.: US 6,779,473 B1
(45) Date of Patent: Aug. 24, 2004

(54) WINGED SAILING CRAFT

(76) Inventor: Douglas James Maconochie, 410 Albany Post Rd., Croton on Hudson, NY (US) 10520

(*) Notice: Subject to any disclaimer, the term of this patent is extended or adjusted under 35 U.S.C. 154(b) by 0 days.

(21) Appl. No.: 10/204,589

(22) PCT Filed: Mar. 31, 2000

(86) PCT No.: PCT/AU00/00272

§ 371 (c)(1),
(2), (4) Date: Aug. 22, 2002

(87) PCT Pub. No.: WO01/72585

PCT Pub. Date: Oct. 4, 2001

(51) Int. Cl.[7] .............................................. B63B 35/79
(52) U.S. Cl. ................................. 114/39.13; 114/102.16
(58) Field of Search .......................... 114/39.12, 39.13, 114/39.21, 39.22, 39.29, 39.31, 39.32, 89, 90, 97, 102.16, 102.18, 102.21, 43, 91, 273; 280/213, 810

(56) References Cited

U.S. PATENT DOCUMENTS

| | | | |
|---|---|---|---|
| 1,823,096 A | * | 9/1931 | Gilbert ........................ 114/273 |
| 3,614,024 A | * | 10/1971 | Millman ......................... 244/2 |
| 3,966,143 A | * | 6/1976 | Smith ........................... 244/16 |
| 4,458,859 A | * | 7/1984 | Ganev .......................... 244/16 |
| 4,512,276 A | * | 4/1985 | Hamann ................. 114/102.12 |
| 4,651,665 A | | 3/1987 | Drake |
| 4,742,977 A | * | 5/1988 | Crowell ....................... 244/123 |
| 4,852,507 A | * | 8/1989 | Ryon et al. ............... 114/39.26 |
| 5,100,354 A | | 3/1992 | Woolley et al. |
| 5,119,748 A | * | 6/1992 | Nishimura ............. 114/102.16 |
| 5,826,530 A | | 10/1998 | Tuurna et al. |
| 6,016,759 A | | 1/2000 | Russell |

FOREIGN PATENT DOCUMENTS

| | | |
|---|---|---|
| AU | A-37114/84 | 7/1985 |
| AU | B-44120/89 | 7/1994 |
| FR | 2655309 | 6/1991 |
| GB | 2 101 947 | 1/1983 |
| GB | 2160 165 | 6/1984 |

OTHER PUBLICATIONS

World's Fastest Sailboat, Popular Science Jan. 1991.

* cited by examiner

Primary Examiner—Andrew Wright

(57) ABSTRACT

A sailing craft that can transform from wind propulsion mode to flying mode, comprises a body and two sails or wings each pivotally connected to a common boom which is supported by a spar pivotally connected to the body. The dihedral angle between the wings can be varied by a system of adjustable stays between the masts and the upper and lower ends of the spar. In sailing mode, either wing can be tilted essentially upright and swung relative to the axis of the body to derive propulsion from the apparent wind whilst the other is essentially horizontal to develop counter balancing moments. In flying mode, both sails can be tilted essentially horizontal to derive lift from the apparent wind.

17 Claims, 9 Drawing Sheets

VIEW BB
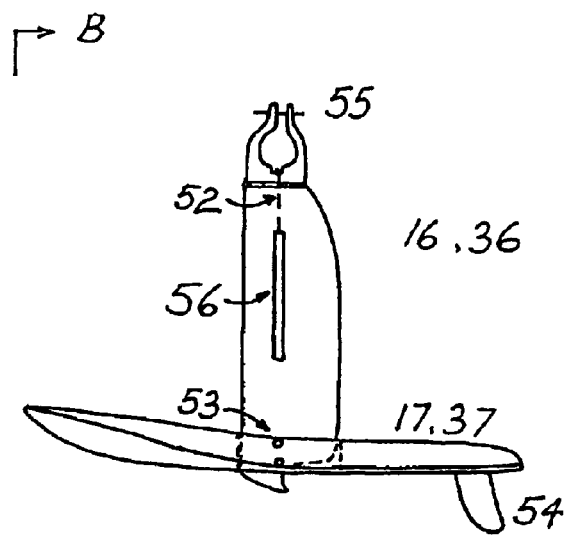
FIG. 6
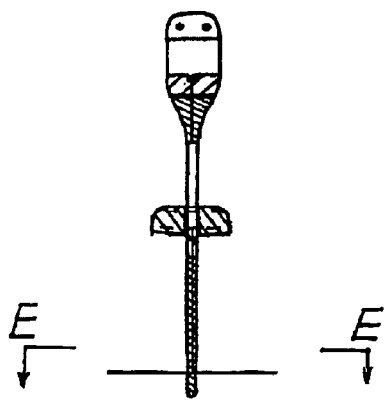
VIEW CC
VIEW EE
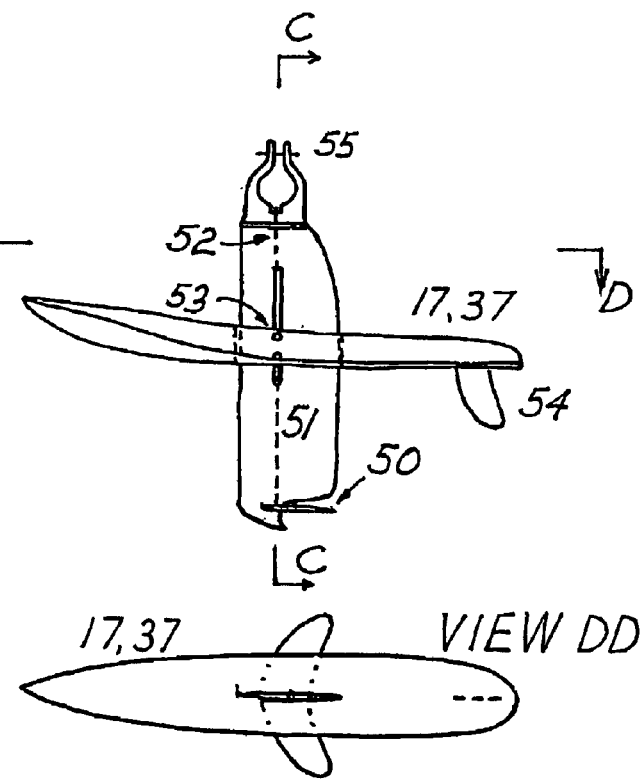
FIG. 7

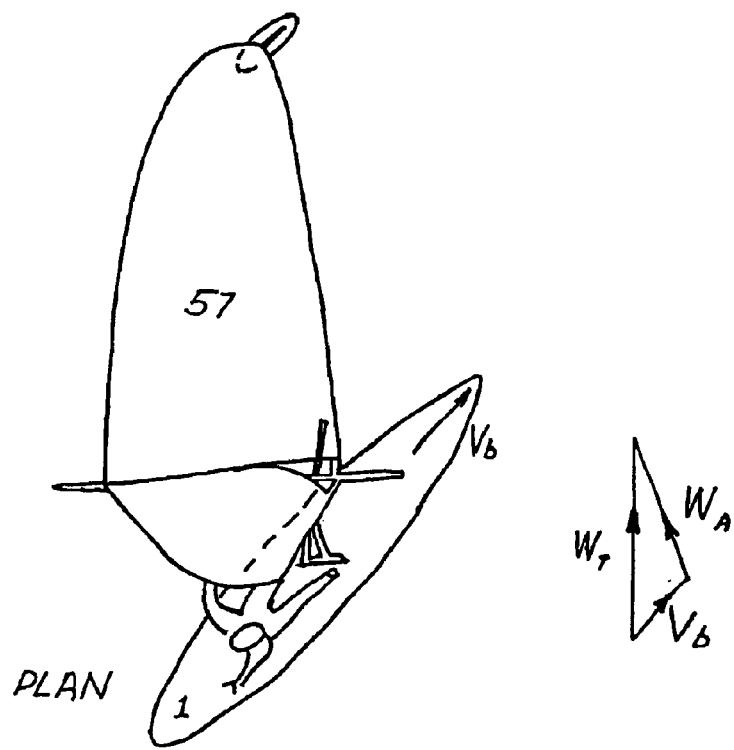
FIG.11 BROAD REACH
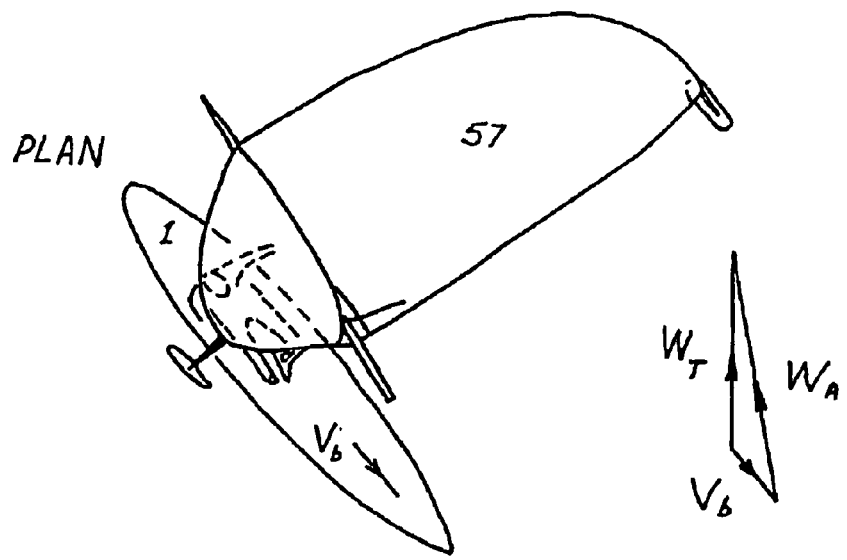
FIG.12 CLOSE HAUL

WINGED SAILING CRAFT

TECHNICAL FIELD

This invention relates to wind propelled craft and more particularly to an arrangement of a pair of wings of variable dihedral angle in which either wing can provide propulsion from the wind whilst the other provides lift or both wings can be used to generate lift.

BACKGROUND ART

The use of counter balancing airfoil surfaces to resist overturning moments from wind propelled craft is taught in several inventions subsequently referenced. The principal weakness in most approaches lies in the inability of the sails or wings to be separately oriented to the longitudinal axis of the craft at all craft speeds and their inability to provide a means of accelerating the craft from rest. Whilst it is well known that the optimum sail orientation for propulsion is approximately vertical, the sail or wing must be able to yaw relative to the craft's direction of motion between the broad reach and close hauled positions. As craft speed increases, the apparent wind direction moves towards the front of the craft which necessitates trimming the sails inwards. Similarly, any horizontal sail or wing, which is used to develop counter balancing forces, must be able to head into the apparent wind to reduce the cross wind component acting on the airfoil. Whilst there are no known craft which currently successfully use sails to develop, in part or in full, counter balancing moments, some inventions teach various elements which are relevant to this invention.

Sailboards are fast wind propelled watercraft. They combine simplicity of sailing rig with a requirement for skill and agility from the sailor to balance the pull from the hand held sail. Whilst the sail can be tilted about the mast step to generate forward propulsion, sail area is limited by the need to balance sail power with the weight of the sailor standing on a narrow board. The sail can be held at a wide angle to the craft axis on a broad reach when the craft is heading essentially downwind or the sail can be held at a small angle to the craft axis in the close hauled mode. The craft is steered by tilting the sail back so that the center of wind effort is aft of the center-board causing the craft to round up into the wind or the craft can be made to turn away from the wind by tilting the sail forward. High speed may be achieved in strong winds when the sail is angled back towards the wind direction with the weight of the sailor underneath the sail, which then generates propulsive forces and lift. A person skilled in the art can jump the board off waves when travelling at high speed and achieve flight for short distances under the initial momentum by tilting the sail to a horizontal position. However, the non-symmetric shape of the sail above the sailor and the relatively small sail area limits the flight to short distances.

A symmetrical sail for a sailboard is taught by U.S. Pat. No. 4,682,557. This device embodies a symmetrical sail pivoted at the top of a short mast, which is attached to a sailboard. The sail can be tilted horizontally to become a lifting wing when the moving craft is headed into the wind. Their device has no means of enhancing resistance to overturning moments whilst in sailing mode, but the sail is symmetrical in flight when the board is jumped off waves. Both this device and conventional sail boards have sail areas limited to approximately 4.5 to 7 square meters in order to remain manageable in up to moderate wind speeds due to the constraints of strength and weight of a sailor standing on a sailboard. A wing area of this size cannot sustain manned flight for any considerable distance. Each wing of the present invention has an area of approximately 4.5 to 7 square meters giving a combined area in flying mode capable of lifting the weight of the craft and crew.

A craft which utilizes airfoil sections in a dual sail configuration whilst providing increased resistance to the heeling moment is taught by U.S. Pat. No. 3,800,724. This craft embodied two airfoil-cambered wings that tilted about an axis parallel to the fuselage. When the left wing is tilted upwards to develop propulsive forces on port tack, the right wing is tilted horizontally to develop lift and vice versa. A rigid link between the wings ensured mutual dependency. When the craft changes tack, the vertical wing is tilted horizontal and the other wing is tilted vertical. In each case, the lifting side of the airfoil section is favorably presented to the wind. Reference is made to an optional embodiment in which the wings may also pivot about a vertical axis to align the wings to the relative wind for optimum performance. However, this craft required a power source to drive actuators, pistons, a propeller to get up to speed, ailerons, and the like. Furthermore, the fixed link between the wings ensured that when both wings were at the same angle to the horizontal, they were relatively steeply inclined thus reducing their vertical lift component.

A similar vee winged device was described in U.S. Pat. No. 3,987,982. However, this craft had no means of varying the angle between the wings, which were rigidly fixed to the fuselage. As the fuselage consequently had to tilt from one side to the other during tacking, the hull required a special shape and the pilot presumably required a tilting seat. The craft also had no means of pivoting the wings about a vertical axis to permit the driving sail to vary between the broad reach and close haul position relative to the craft longitudinal axis. It consequently would have had difficulties in moving off from rest and getting up to speed. These latter two referenced craft required a vertical rudder and ailerons to vary the angle of attack of the wings to the wind. The craft of the present invention avoids such requirements by incorporating means of controlling a single pair of wings in the wing support spar. This spar provides for tilting of the horizontal wing and a separate capability to correct the movement of the center of effort of the vertical wing that would otherwise occur, by providing a separate sliding movement of the boom along its axis relative to the spar. The requirement in U.S. Pat. No. 3,987,982 to tilt the body from one tack to the other is avoided in the present invention by the use of a universal joint between the body of the craft and the wing support spar. The body of the present invention consequently can have a flat hull such as in a simple sailboard type planing hull with a vertical center board to provide optimal resistance to lateral drift whilst in sailing mode.

A simple approach to providing simultaneous propulsion whilst providing resistance to overturning moments is taught by U.S. Pat. No. 4,674,427. A single straight wing with floats at each end is supported laterally to one side of a narrow hull. During tacking the wing must be flipped end for end to the other side of the hull. Although this device eliminates the overturning moment on the craft body when sailing, it has no means of varying the yaw angle of the sail relative to the craft axis in order to gather speed from rest. This craft would have had difficulties in tilting the sail to the opposite side of the hull during tacking.

A mast pivoting mechanism was taught by U.S. Pat. No. 4,706,590 to reduce heeling moments of the supporting vessel. However, whilst the mechanism provided a means of altering the angle of the mast relative to the hull, the device offered no means of counter balancing the over turning moments from the sail.

Resistance to over turning moments using an adjustable hydrofoil suspension system is taught by U.S. Pat. No. 5,168,824. The system provides for the adjustment of the foil surface's angle of attack in response to the movement of a float that senses the level of the water's surface whilst filtering out high frequency undulations using a system of flexible beams. The adoption of two or more such systems of beams to a watercraft permitted control of the heeling forces. Their preferred embodiment comprised two vertically mounted sails supported on buoyant outriggers displaced laterally on either side of a central hull. This craft has achieved very high speeds and confirms the effectiveness of damped flexible floats in controlling the attitude of outriggers and hydrofoils. However, each sail is required to perform equally on either port or starboard tack limiting the development of high performance non-symmetrical airfoil wing type sails. The present invention provides a capability of utilizing such hydrofoils and floats on the far extremities of the wings without the use of additional flexible beams whilst simultaneously using a horizontal wing to provide additional lift.

DISCLOSURE OF INVENTION

The above shortcomings of the prior art are overcome by the sailing craft of the present invention. The sailing craft of the present invention comprises a hull and two sails or wings each pivotally connected to a common boom at their inboard end and supported laterally by stays from a central support spar. The dihedral angle between the plane of the sails or wings can be varied between approximately 90 degrees to approximately 175 degrees. A propulsion mode is characterized when the sails are at right angles to each other, or thereabouts; one sail is essentially vertical whilst the other is horizontal and vice versa thereby obtaining propulsion from the upright sail and stabilizing lift from the horizontal sail. Both wings being essentially horizontal characterize a flying mode.

The present invention differs from previous inventions by the pivotal attachment of the lower end of the wings and masts to a common boom, which is supported above the body by the central spar. The spar's universal joint connection to the body allows the wings to yaw to either side of the body axis to permit broad reaching and close haul sailing from the upright wing. The support spar ensures that the boom is held above the sailor in propulsion mode whilst supporting the weight of the body and sailor from the boom in flying mode. The adoption of a common boom ensures that when the upright wing is in the broad reach position, the horizontal wing is angled forward into the apparent wind to develop lift and provide support to the upright wing. When broad reaching, the apparent wind has a substantial cross wind component to the craft's heading thus necessitating the need for substantial yaw of the horizontal wing well forward to face into the apparent wind as much as possible to optimize lift. As the craft speed increases, the angle between the craft's heading and the apparent wind reduces. When close hauled, the boom of the vertical wing is at a minimum angle to the body's axis and the horizontal wing is almost square to the body axis, at which point neither of the two wings are heading directly into the wind. Lateral drift of the craft is controlled by use of a centerboard and tail fin in the same way as conventional sailboards or yachts. These devices extend below the hull into the water and provide the necessary reaction to determine propulsive forces acting on the craft from the resultant forces. Both wings must be simultaneously controlled in a dynamic environment, the vertical wing for lateral swing angle relative to the body axis and vertical pitch, whilst the horizontal wing must be controlled primarily for angle of attack to the apparent wind. Both movements are permitted by allowing the spar to tilt backwards whilst providing a separate sliding movement of the boom in a guide sleeve attached across the center of the support spar. The overturning and stabilizing moments act about the boom axis within the wing, boom, support spar and rigging system, and are not transferred to the body of the craft.

The present invention provides a means of turning the craft in a similar manner to contemporary sailboard craft. The support spar can tilt backwards towards the stern thus tilting the boom down towards the rear of the craft and the upright mast back, moving the center of effort of the propulsion wing aft of the center board and thus turning the craft into the wind. In order to allow for the down wards tilt of the boom without shifting the center of effort of the propulsion sail, if a straight course is required, provision is made to allow sliding of the boom relative to the support spar. The center part of the boom is covered with a bearing surface to permit the boom to slide forward within the support spar and move the center of effort from the propulsion wing forward in order to make the craft turn away from the wind. Forward tilt of the support spar is limited by a horizontal extension to the support spar at its lower end. The extension ensures that the angle of attack of the horizontal sail is always positive in order to avoid dipping the floats attached to the end of each mast into the water. These floats are required to provide additional support to the horizontal sail when the craft is moving off from rest and the aerodynamic lift forces from the horizontal wing are low.

The craft can be made to tack when underway by tilting the support spar backwards, thus causing the craft to round up into the wind. When both wings are heading equally into the wind the horizontal sail will lift up until both wings are developing equal lift. If the boom is swung across the craft axis towards the wind, the turn of the craft will continue beyond the wind direction under its own momentum and the previously horizontal sail will fly up and become the upright propulsion sail and the craft will be on the opposite tack. Optionally, a rudder can be used to provide separate turning ability without impairment of the principles just described.

Flying mode is achieved by altering the dihedral angle of the wings during the execution of tacking as previously described. The present invention overcomes the problem of yaw instability of a pair of wings with a large dihedral angle between them by providing a simple means of altering the angle between the wings. The angle between the masts can be varied from approximately 90 degrees to approximately 175 degrees by altering the angle between the mast and the support spar. The support spar holding the boom above the body has a lower end and an upper end with the sleeve holding the boom centrally located. Stays extend to each mast from the upper and lower ends. The side stays from the mast are passed through pulleys at the top and bottom of the support spar to form a loop of fixed length. The maximum length of the loop is defined when the sails are both almost horizontal and the spar is vertical. When the center point of the loop to each mast is connected and pulled down towards the hull, it is forced to deviate along a specially shaped guide slot built into the spar to take up the slack that would otherwise be formed. The support spar is thus tilted relative to each mast, reducing the angle between the masts. As both sets of stays are connected to the stay deviator, the support spar always bisects the angle between each mast through symmetry. Fore stays extend from a forward extension of the boom back to each mast to provide forward support to the mast whilst rear support is provided by the connection of the foot of the sail to the boom. Either sail can be tilted essentially upright to derive propulsion from the wind whilst the other is essentially horizontal to develop counter balancing moments, or both sails can be tilted essentially horizontal to derive maximum lift from the apparent wind.

The object of the craft is to obtain sufficient speed from wind propulsion to achieve controllable flight from its own momentum when turning into the wind. The present invention provides a means of achieving controllable flight over short distances by a variation to the tacking maneuver. When the craft is heading into the wind under its own momentum and both sails are generating lift, the dihedral angle between the wings is increased to approximately 175 degrees until both wings are essentially horizontal. As the wings tilt down, the lift from each is automatically balanced and the boom is brought into alignment with the longitudinal axis of the body. If the boom is kept angled down towards the stern above the craft axis instead of pushing it across towards the wind as in the tacking maneuver, then the lift is increased due to the increased angle of attack of both wings. Under favorable conditions and sufficient momentum, the craft will achieve take off. To prevent the body of the craft from hanging down from the universal joint connection with the lower end of the support spar, the lower end of the spar is provided with a forwardly directed foot which engages with the body of the craft under the weight of the crew.

The sail wing system of the present invention is intended to provide a means of compatible transition between wind propulsion across the horizontal plane and take off. Once airborne, the support spar, boom and control bar provides the means of controllable flight in a similar manner to hang gliders. The forward horizontal extension to the support spar automatically provides a balancing cantilever support to the weight of the board and sailor that is aft of the connection of the lower end of the spar and the body of the craft. The body of the craft is consequently automatically supported parallel to the boom. A sliding bearing connection between the boom and the support spar is designed to support the wings and provide a means of moving the weight of the board and sailor forward or aft relative to the center of lift from the wings, to control pitch. By pulling the control bar astern, the center of gravity of the board and sailor is moved forward relative to the center of lift of the wings. Conversely, if the boom is moved forward within the support spar, the center of gravity is moved aft relative to the center of lift. The center of gravity can also be moved to either side of the boom by gently pulling the control bar to the left or right, thus permitting banking and turning. Landing is achieved by pushing the control bar forward and flaring the wings. Under such circumstances, the center of mass moves aft increasing the angle of attack of the wings and precipitating a stall as touch down occurs at the stern. The support spar can then hinge back relative to the body axis maintaining the high angle of attack of the wings whilst the hull skids across the water to provide a gentle landing.

BRIEF DESCRIPTION OF DRAWINGS

FIG. 6 is a side and front elevation of the wing float strut and float, FIG. 7 is a side elevation and several views of a hydrofoil variation of the wing float strut and float, FIG. 11 is a plan view of the apparatus heading in a broad reach orientation relative to the true wind direction, FIG. 12 is a plan view of the apparatus heading in a close haul orientation relative to the true wind direction.

BEST MODE FOR CARRYING OUT THE INVENTION

Whilst the above summary provides a general description of the application to a wide range of craft, the preferred embodiment is described in the subsequent detailed description.

Figure 1:
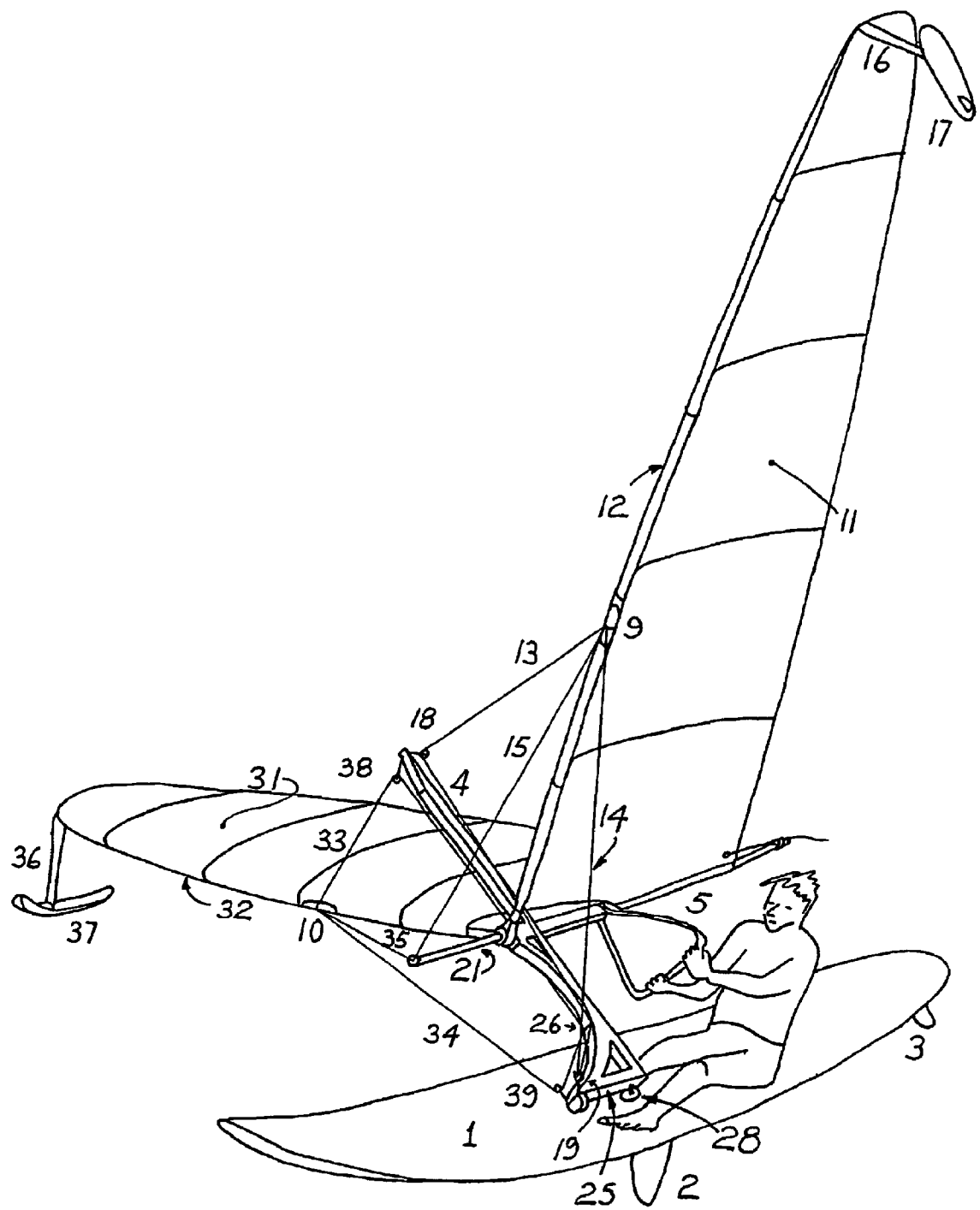
FIG. 1 is a perspective view of the present invention according to its application on a sailboard.

Referring to FIG. 1, the present invention comprises a hull 1 which can be either a slightly modified sailboard or special purpose designed hull manufactured from plastic such as polyethylene with a center board 2 and tail fin or rudder 3. The sailing wing of the present invention comprises a left wing 11 and right wing 31 held aloft by masts 12 and 32 respectively that are pivotally connected to the boom 21. The masts 12 and 32 may be manufactured from carbon and glass fibre reinforced thermosetting plastic. The boom 21 is manufactured from similar materials such as a carbon fibre composite material and is supported by a support spar 4 pivotally connected to the hull 1. This support spar 4 may be fabricated from aluminum structural sections or alternatively from similar composite materials.

The left and right masts 12 and 32 are held in position laterally by left and right upper stays 13 and 33 that extend from the left and right mast fittings 9 and 10 to top pulleys 18 and 38 respectively. Left and right fore stays 15 and 35 hold the mast in a fore and aft direction. The top pulleys 18 and 38 are located at the top of the support spar 4. The stays 13 and 33 are connected to the deviator slider 26. Similar lower stays 14 and 34 extend from the mast fittings 9 and 10 to the bottom pulleys 19 and 39 and therefrom to the deviator slider 26 thus forming two complete loops. The stays 13, 14, 15, 33, 34 and 35 can be made of stainless steel wire and sheathed in plastic.

Referring to FIG. 1, the masts 12 and 32 carry struts 16 and 36 pivotally connected to the masts at their far left and right extremities respectively. Left and right floats 17 and 37 are connected to these struts 16 and 36 so that each float can rotate in a plane normal to the axis of each respective strut 16 and 36.

The sailor is seated on the hull 1 aft of the support spar 4 where he can hold on to the control bar 5, which is rigidly connected to the boom 21 and control the position of the wings. The support spar 4 is pivotally connected to the hull by a universally jointed connection 28. The spar 4 has a forward extension at its base called a foot 25 parallel to the boom 21. This foot 25 can pivot to the left or right of the hull axis about the universal joint 28 so that the boom 21 can yaw to the left or the right. The foot 25 of the support spar 4 is designed to skid across the top of the hull 1 as the upright wing varies in position from close haul to broad reach position. The support spar 4 is thus prevented from tipping forward under the propulsive forces acting on the upright sail if the sailor should happen to let go of the control bar 5. Universal joint 28 permits tilting of the support spar 4 backwards to allow the boom 21 to tilt down towards the stem. However, if the boom 21 tilts down it can only dip as low as the water at which point the trailing edge of the wing will touch the water and float. The sailor can swing the boom left or right and down but the forward tilt is limited by the forward extension 25 of the support spar 4. This forward extension also prevents the hull of the craft from swinging down under the weight of the sailor when the craft is airborne and the hull 1 is fully suspended from the wings 11 and 31 via the support spar 4.

Figure 2:
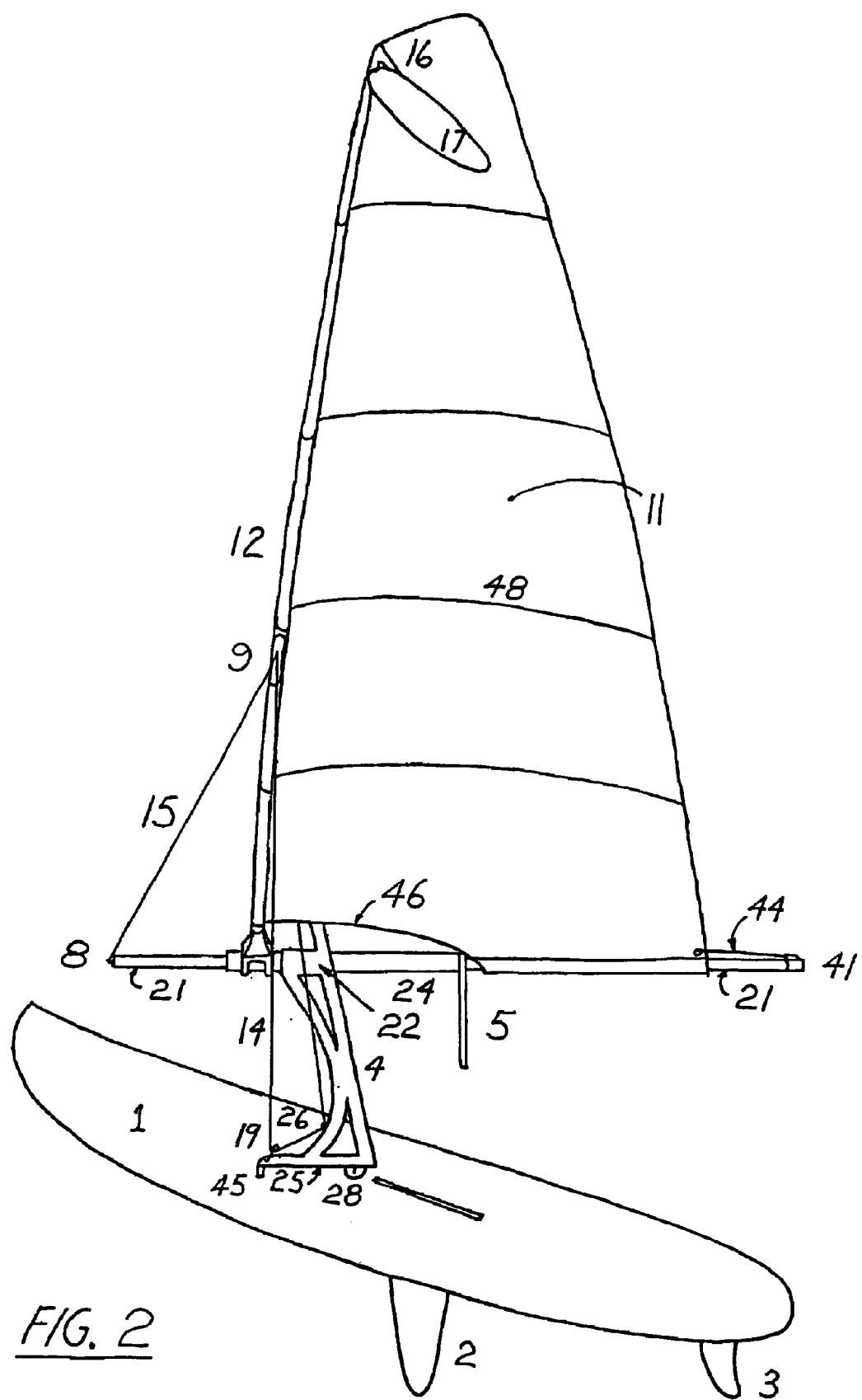
FIG. 2 is a rear perspective of the same apparatus.

FIG. 2 illustrates the wing 11 stretched between the mast 12 and the boom 21. The wing can be fabricated from a single layer of tear resistant fabric commonly used in conventional yacht sails stiffened with battens 48. The right wing 31 is symmetrically identical about the boom 21. In any of the designed modes of operation of the wing, the airfoil surface is always favorably presented to the apparent wind. The wings can consequently comprise an airfoil-cambered shape, chord wise, to obtain maximum aerodynamic efficiency and minimum drag from a small wing area. Hence, the wing may alternatively be made from similar fabric except with two surfaces; the upper surface is cambered chord wise with battens 48 and the lower surface is generally flat to form an airfoil profile similar to a hang glider wing. Fore stays 15 and 35 extend from a fore stay connector swivel fitting 8 on the forward extension of the boom 21 back to the left and right mast stay fixings 9 and 10 respectively, to provide forward support to each mast. Rear support to the masts is provided by the connection of the foot of each wing 11 and 31 to the boom 21. The foot of each wing 11 and 31 is held in tension along the boom 21 by a cleat 41 and out haul 44. A pocket 46 is cut out of each wing to allow the boom slider 24 attached to the boom 21 to slide back wards and forwards in the box section of boom guide 22. A foot skid 45 is provided at the forward end of the foot 25 to protect the hull 1 from damage.

Figure 3:
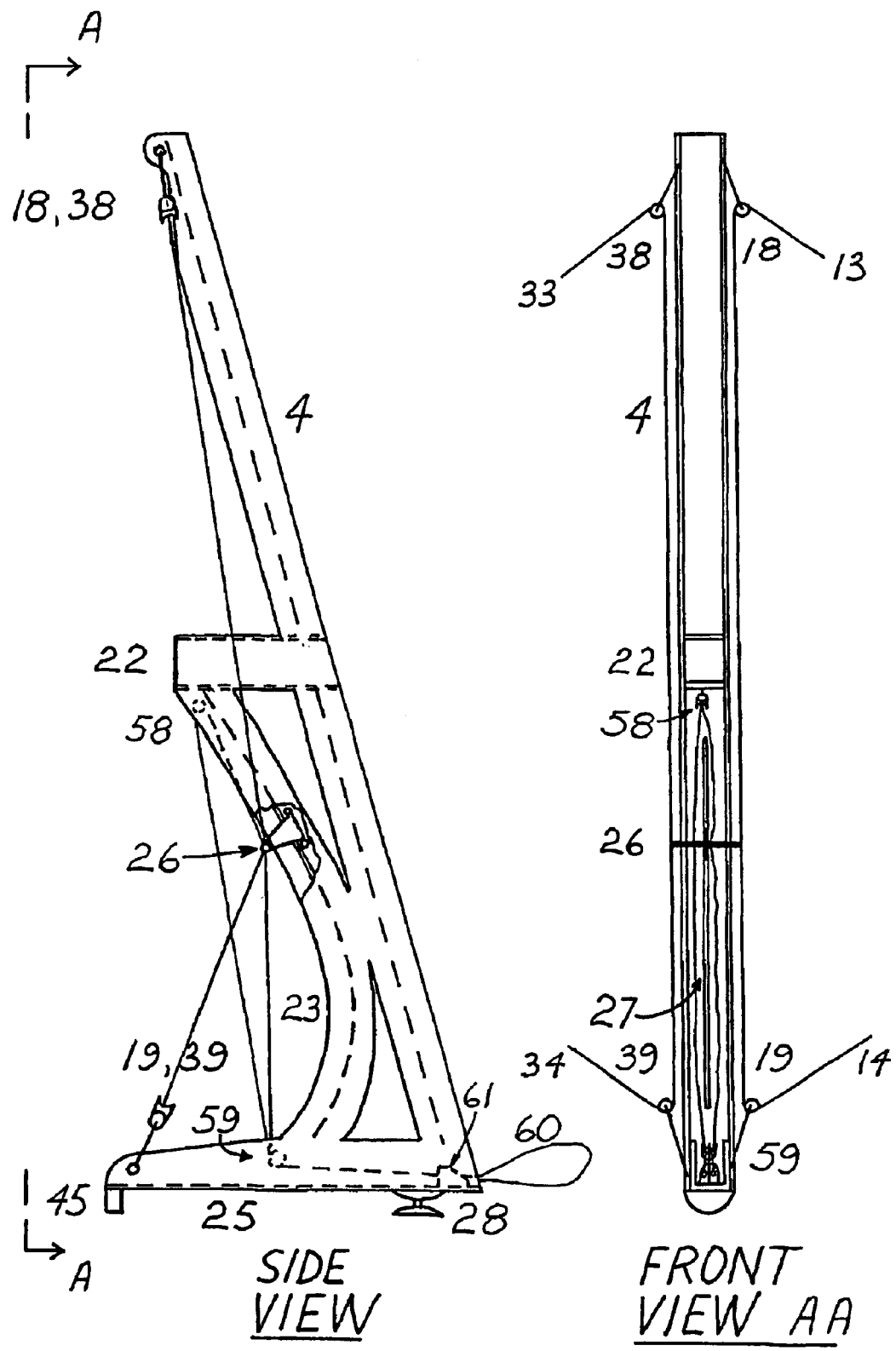
FIG. 3 is a side elevation and front view of the support spar with some parts cut away to illustrate certain parts thereof.

Referring to FIG. 3, the support spar 4 comprises an aluminum or carbon fiber structural section extending lengthwise between the upper and lower ends. A square hollow section is rigidly attached at the mid-point transfixing the support spar 4 to form a boom guide 22. The axis of the boom guide 22 is almost at right angles to the support spar 4, so that the support spar 4 has a slight inclination in the forward direction when the boom guide 22 is horizontal. A structural section extends in the forward direction from the lower end of the support spar 4 to provide a foot 25 parallel to the boom guide 22. A curved track extends between the boom guide 22 and the foot 25 to form the stay deviator guide 23. The stay deviator guide 23 comprises a structural section of similar material to the support spar 4 and is rigidly connected to the spar 4, boom guide 22 and foot 25. The top left and right pulleys 18 and 38 are attached to the upper end of the support spar 4 and the bottom left and right pulleys 19 and 39 to the forward end of the foot 25.

Referring to FIG. 1 and FIG. 3, one end of both the left upper stay 13 and left lower stay 14 is connected to the left mast fixing 9, whilst the other ends of these stays 13 and 14 are passed through their respective top and bottom pulleys 18 and 19 and are connected to the deviator slider 26. Similarly, the ends of the right upper stay 33 and the right lower stay 34 are connected to the right mast fixing 10 whilst the other ends of these stays 33 and 34 pass through their respective top and bottom pulleys 38 and 39 and are connected to the same deviator slider 26.

Referring to FIG. 3, the stay deviator guide 23 includes a fitting or guidance method for causing the deviator slider 26 to follow a mathematically defined shape of the stay deviator guide 23. One such method is to make the stay deviator guide 23 from an aluminum section bent to the required shape and attached rigidly to the boom guide 22 and strut foot 25 and to cut a slot 27 in the web of the section. The deviator slider 26 may comprise a truck and wheels with a tongue extending through the slot 27. The slider 26 can be moved along the stay deviator guide 23 by either a system of ropes and pulleys or by hand provided a locking mechanism is used to hold the slider at the required location. A rope system is shown in FIG.3 whereby a rope 60 extends from the deviator slider 26 to a top pulley 58 and therefrom to a double bottom pulley 59 and through a double jamb cleat 61 and back through the bottom pulley 59 to the deviator slider 26. Other methods having similar effect may be used to deflect the stays from the straight line joining the top stay pulleys 18 and 38, and bottom stay pulleys 19 and 39 without departing from the principle. In flying mode, the rope 60 may take the full weight of the craft and crew. At the rear end of the foot 25, a universally jointed connection 28 is provided to join the lower end of the spar 4 to the hull 1 in the vicinity of the forward end of the center board 2 as shown in FIG. 2. The universal joint 28 essentially comprises a base plate which is bolted to the hull, an upper plate which is attached to the support spar and a rope encased in flexible rubber linking the two plates. A foot skid 45 is attached to the forward end of the foot 25 to protect the hull 1.

Figure 4:
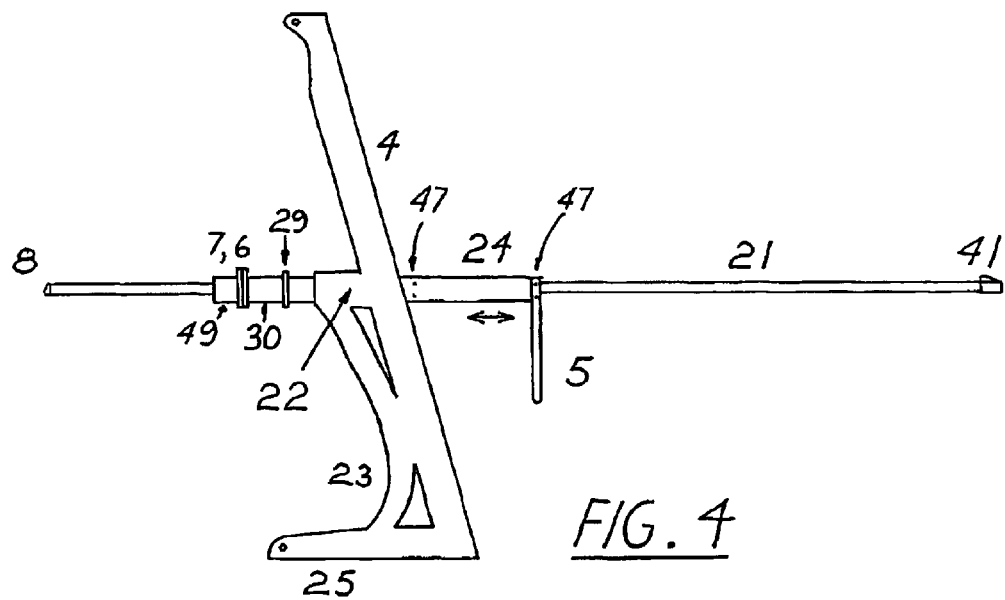
FIG. 4 is a side view of the support spar and boom to illustrate certain parts thereof.

Referring to FIG. 4, the boom 21 is partially encased by a protective sleeve comprising the boom slider 24, keeper 29, mast coupler bearing 30 and threaded forward section 49 manufactured from nylon or similar tough material. The boom slider 24 comprises a square section which is supported within the box section 22 which is rigidly attached to the support spar 4 and the stay deviator guide 23. The box section 22 is smoothly finished on the inside to provide a low friction guide to the boom slider 24. The boom slider 24 protects the boom and acts as a bearing to permit the boom to slide forward or aft within the boom guide 22 without rotation. The boom slider 24 is rigidly attached to the boom 21 by clamping a slotted section of the bearing against the boom using counter sunk bolts 47 which also attach the control bar 5 to the boom protector. This control bar 5 can be made of tough impact resistant plastic or other durable materials. At the forward end of the boom slider section 24 there is a keeper 29 which prevents the boom from being pulled too far towards the stern. The range of movement is limited to ensure that the center of gravity of the hull and crew is only within a stable range of the wings. The control bar 5 similarly acts as a keeper to prevent the slider 24 from moving too far forward within the boom guide 22.

Figure 5:
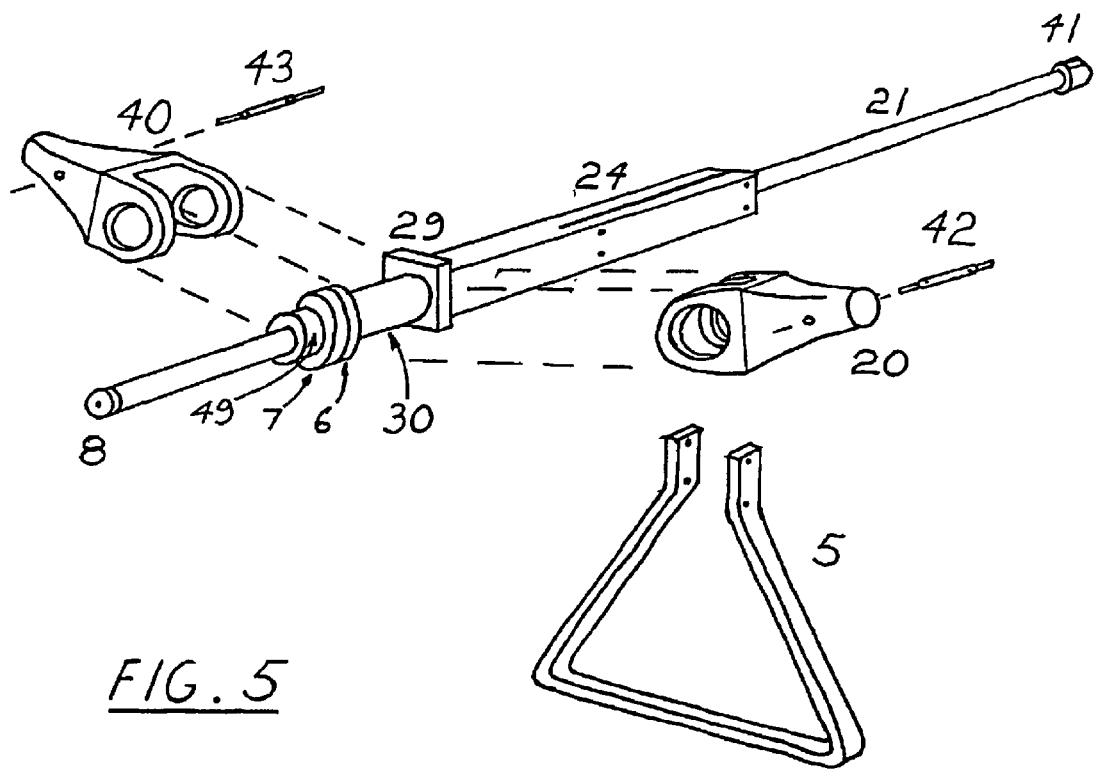
FIG. 5 is a view of the mast step fittings and boom illustrating certain details thereof.

Referring to FIG. 5, an annular section 30 in front of the keeper 29, serves as a bearing for the left and right mast couplers 20 and 40. These latter devices are attached to the foot of each mast 12 and 32 of FIG. 1. The couplers 20 and 40 are slide mounted on to the bearing 30 from the front over the threaded section 49 after which adjuster nut 6 and locking nut 7 are fitted to the threaded section 49. These two nuts are made of plastic such as PVC or nylon. The mast couplers 20 and 40 pivot around the bearing 30 axial to the boom 21 and are held in position by adjuster nut 6 and locking nut 7. The mast couplers are manufactured from tough, impact resistant plastic designed to provide some flexibility in the linkage of the masts 12 and 32 to the boom 21. The masts 12 and 32 each slide into a cylindrical socket formed on the back of the couplers 20 and 40. The masts are held in place and prevented from twisting in the socket by locking pins 42 and 43 in couplers 20 and 40 respectively.

Referring to FIG. 6, a left float 17 is supported by a strut 16 that is pivotally connected by pivot bolt 52 to a mast fitting 55. This fitting clamps on to the far end of the left mast 12 and provides an anchorage for the upper part of pivot bolt 52. The lower part of pivot bolt 52 passes into the strut 16 and terminated in the top of slot 56. The strut passes through a center board case along the middle of the longitudinal axis of the float 17. The float is attached to the strut with two pins 53. Similar arrangement is provided for right strut 36 and right float 37.

A modification of this arrangement is shown in FIG. 7 that has the float 17 higher up the strut 16 where the pins 53 can pass through slot 56 in the strut 17. A hydrofoil blade 50 is connected to the base of the strut 16 to pivot horizontally about a lateral axis. A flexible push rod 51 is connected from the lower pin 53 through a hole in the strut to attach to the hydrofoil blade 50. Movements of the float 17 relative to the strut 16 causes the hydrofoil to alter its pitch thereby altering the lift to dynamically assist the floatation provided by the float 17 when the craft is travelling at speed in rough water.

Figure 8:
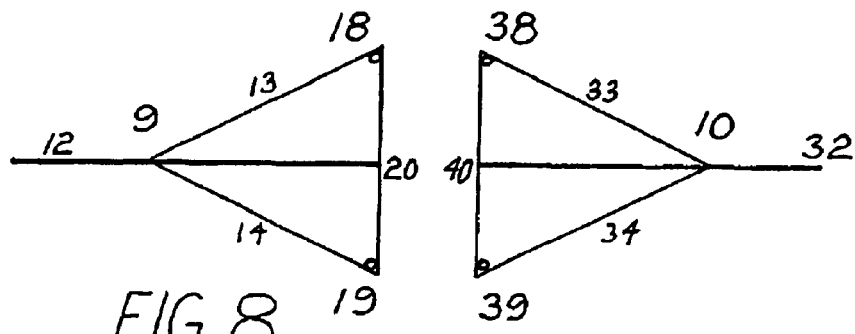
FIG. 8 is a schematic of the geometry of the mast, support strut and stays under certain conditions.

Referring to FIG. 8, the upper angle between the left mast 12 and the support spar 4 may be varied by the left upper stay 13 and left lower stay 14 and similarly for the right mast 32 and its respective stays 33 and 34. FIG. 8 illustrates two isosceles triangles formed between points 18, 9, 19 and 38, 10, 39. Line 9–20 represents the section of the left mast 12 between the mast fitting 9 and the coupler 20 bisecting the left triangle. Similarly, the line 10–40 represents the section of the right mast 32 between the mast fitting 10 and the coupler 40 bisecting the right triangle. Referring to the left wing 11, the left mast 12 is pivotally connected to the boom 21 by the coupler 20. Referring to FIG. 8 when the triangles are isosceles, the wing is horizontal and the distance between the lower pulley 19 and the mast fitting 9 is equal to the distance between the upper pulley 18 and the same mast fitting 9. The upper stay 13 is a continuous wire of maximum length equal to the distance between points 9 and 18 plus the distance 18 to 20 when the triangles are isosceles. The upper stay 13 is extended through pulley 18 and joined to the stay deviator slider 26. Similarly, the lower stay 14 is a continuous wire of maximum length equal to the distance between points 9 and 19 plus the distance 19 to 20 when the triangles are isosceles. The lower stay 14 is extended through pulley 19 and joined to the stay deviator slider 26. The upper stay 13 is consequently the same length as lower stay 14. A similar relationship exists for the right upper and lower stays as shown in FIGS. 8, 9, and 10.

Referring to FIG. 3 and FIG.8, the stay deviator slider 26 slides along a specially shaped guide 23 which extends between the foot 25 of the support spar 4 and the boom guide 22. When the left mast 12 is at right angles to the support spar 4, the midpoint of the loop thus formed from the upper and lower stays is attached to the stay deviator slider 26 at the upper limit of travel just below the boom 21. At this point, the stays stretching between pulleys 18 and 19 and connected to the slider 26 are all in a straight line.

Figure 9:
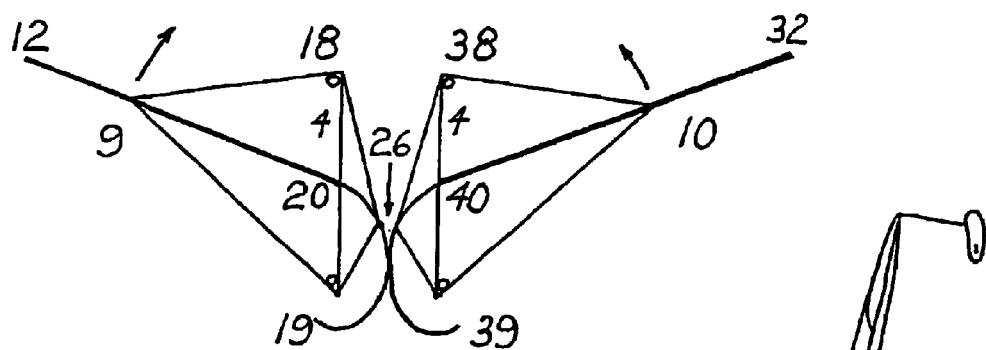
FIG. 9 is a schematic of the geometry of the mast, support strut and illustrating the locus of the point described by the midpoint under certain alternative conditions.
Figure 10:
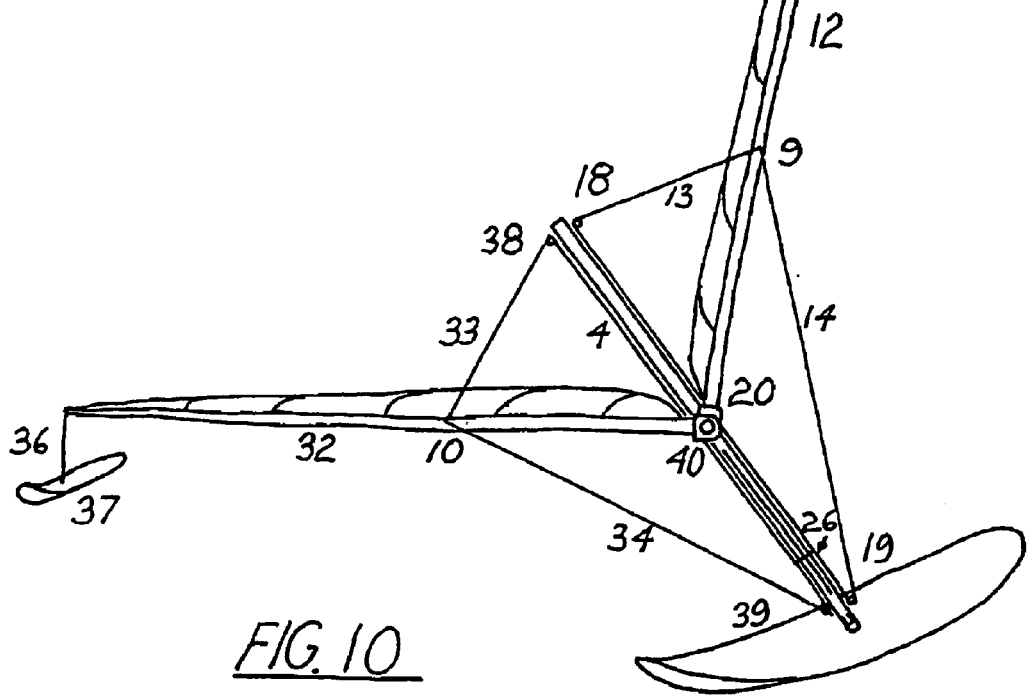
FIG. 10 is a front view of the apparatus illustrating the geometrical application according to the present invention.

FIG. 9 illustrates the mast section 9–20 tilting relative to the axis of the support spar 4, represented by the base of the triangles 18–19. The midpoint of the loop formed from the stays must be deviated from the straight line between the pulleys 18 and 19 in order to take up the slack that would otherwise occur as the angle at 20 between 9 and 18 reduces from a right angle. The curve shown at the base of the triangle in FIG. 9 represent the locus of the path traced out by the deviator slider 26, such that the length of the upper and lower stays passing through the pulleys 18 and 19 remain equal to the maximum length which occurs when the mast 11 is at right angles to the axis of the spar 4. The locus is calculated from coordinate geometry. Similar geometry is developed for the right mast as shown FIGS. 8 and 9.

The stay deviator guide 23 serves as a guide for the stays to both the left and right masts simultaneously to ensure that the axis of the spar 4 always bisects the angle between the left mast 12 and the right mast 32. The plane of the stay deviator guide 23 is set at right angles to the plane of the triangles 9,18,19 and 10,38,39 to ensure symmetry and to facilitate connection of all the stays to the deviator slider 26. The advantage of such a mast tilting mechanism over other systems is that the stays can be pre-tensioned and fixed length. It is a feature of the present invention that the deviator slider 26 provides a quick and simple method of varying the angle between the wings whilst underway. The bottom limit of travel of the slider 26 along the guide 23 results in the mast tilting at approximately 45 degrees to the support spar giving an angle of 90 degrees between the wings. As both sets of stays are joined to the slider, by symmetry, the dihedral angle thus formed between the wings can be increased up to approximately 180 degrees at which point the slider 26 is at the upper limit of travel within the deviator 23.

When the angle between the masts 12 and 32 is reduced to approximately 90 degrees and the support spar is tilted 45 degrees to the left, the left wing is horizontal and the right wing is approximately vertical. The length of the left wing tip float strut 16 is such that the wing is supported approximately horizontal by the float 17. A similar symmetrical arrangement is provided for the right wing as shown in FIG. 10.

Referring to FIG. 11, the craft of the present invention can develop lift from a horizontal wing even when the horizontal wing 57 initially appears to be in an unfavorable orientation relative to the true wind vector Wt. As the speed of the hull 1 increases, as shown by vector Vb, the apparent wind speed represented by vector Wa moves round towards the front of the craft reducing the cross wind component of the apparent wind crossing the horizontal wing. Whilst the horizontal wing may have significant cross wind component at low speed, at high craft speed more favorable conditions develop as the apparent wind is increasingly head on to the horizontal wing. The lift on this wing may be increased as required by tilting the boom down increasing the angle of attack whilst sliding it forward or back to compensate the movement in the center of effort of the vertical wing. The craft may consequently be held to a straight course whilst sailing both wings simultaneously to lift the hull of the craft from the water and derive propulsion whilst keeping the center board embedded in the water to preserve resistance against lateral drift.

Referring to FIG. 12, the craft is shown in close haul mode. The apparent wind presented to the horizontal wing 57 is most favorable to develop significant lift.

Figure 13:
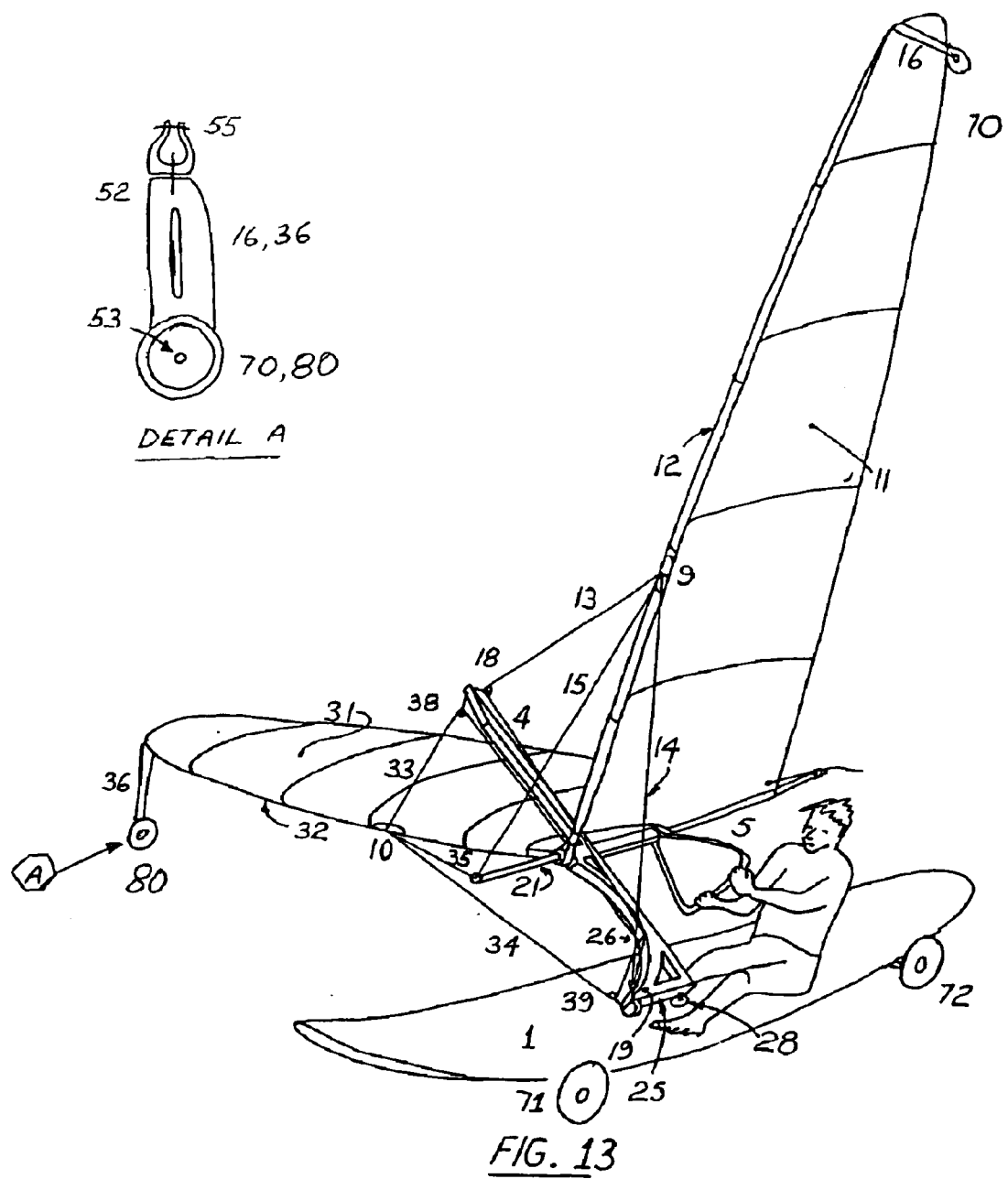
FIG. 13 is a perspective view of the craft showing wheels for running along the ground surface substituted for the wing tip floats and wheels beneath the body to support the craft on land.

Referring to FIG. 13, a body for running along solid ground surfaces is substituted for the planning hull. The body is supported by wheels the forward pair 71 being steer able and the rear pair 72 being fixed. The left and right wing tips are supported by wheels 70 and 80 attached to the bottom of the strut 16 and 36 respectively using the lower of the pins 53.

Figure 14:
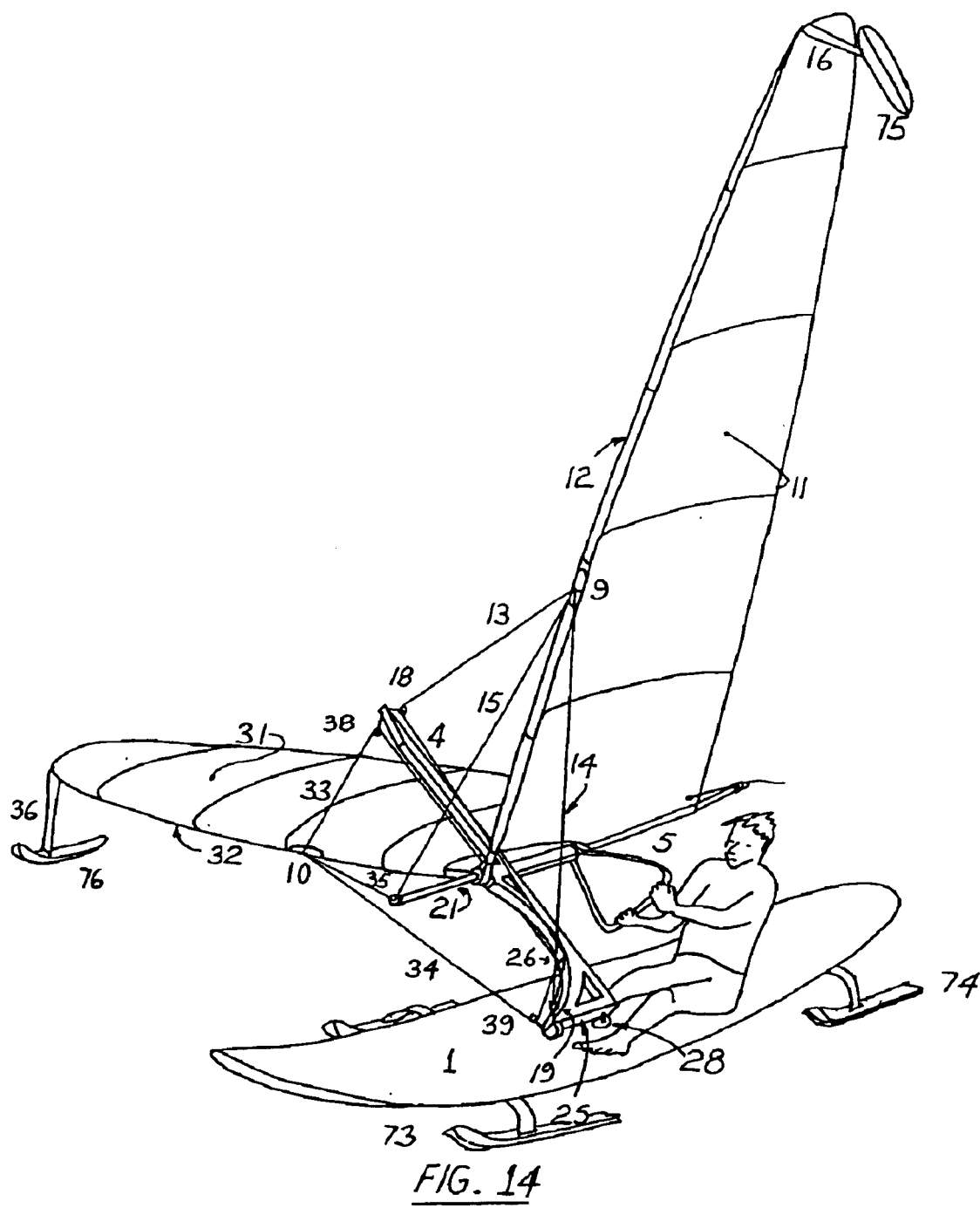
FIG. 14 is a view similar to FIG. 13 but with combination snow skis and ice skates substituted for wheels for running along the surface of snow and ice.

Similarly in FIG. 14, a body for running along surfaces of ice or snow is supported by combined skis and ice skates, identified as runners; the forward pair 73 being steer able and the rear pair 74 being fixed. The left and right wing tips are supported by runners 75 and 76 attached to the bottom of the strut 16 and 36 respectively using the lower of the pins 53. On ice and snow the runner keel provides sideways resistance to sliding.

Whilst a particular form of the invention has been illustrated and described, it will also be apparent to those skilled in the art that various modifications can be made without departing from the spirit and scope of the invention. In the case of a modification whereby the hull means is replaced by a craft with wheel means, similar means of attachment of the support spar 4 to the vehicle and a horizontal body in the vicinity of the foot 25 and rubbing strip 45 are required. Similar attachments are required for a craft with runner means for use on ice or snow.

Accordingly it is not intended that the invention be limited except as by the appended claims.

I claim:

1. A winged sailing craft comprising:

a body having an essentially horizontal longitudinal axis operable by a crew along a surface of water, land, ice or snow;

a spar that is attached to the body; the spar moveable in roll, pitch and yaw;

a boom having a longitudinal axis and connected to the spar, the boom axially moveable in the spar;

a pair of wings each having an inboard and separated from an outboard end by means of a mast extending lengthwise there between, each inboard and of the masts attached to the boom;

the wings having an airfoil section, chord wise and having planar symmetry about he boom axis;

the wings creating an angle that the spar always bisects;

the angle being changeable by pivoting the masts on the boom.

2. The winged sailing craft of claim 1, wherein said body of the craft comprises a planing hull made of light weight materials and of sufficient volume to float the weight of the craft and crew.

3. The winged sailing craft of claim 2, wherein a centerboard extends below the hull to project into the water for receiving lateral force exerted by the water over which the hull is propelled.

4. The winged sailing craft of claim 1, wherein the outboard end of each wing having a float flexibly and pivotally attached by a strut projecting essentially at right angles to the approximate plane of the wings.

5. The winged sailing craft of claim 1, wherein the outboard end of each wing having a hydrofoil and float flexibly and pivotally attached projecting essentially at right angles to the approximate plane of said respective wing.

6. The winged sailing craft of claim 1, wherein said body of the craft is provided with wheels to support and steer said craft on substantially solid surfaces and the outboard end of each wing having a wheel flexibly and pivotally attached by a strut projecting essentially at right angles to the approximate plane of said respective wing.

7. The winged sailing craft of claim 1, wherein said body of the craft is provided with runners to support and steer said craft on ice or snow surfaces and the outboard end of each wing having a runner flexibly and pivotally attached by a strut projecting essentially at right angles to the approximate plane of said respective wing.

8. The winged sailing craft of claim 1, wherein said spar having an upper end and a lower end and extending lengthwise there between, is further provided with a member projecting rigidly on one side of said lower end of said spar thus forming a foot and having at said lower end of said spar, a universal joint connection to said body located above the longitudinal axis of said body and said spar additionally having a hollow sleeve rigidly connected across said spar parallel to said foot; said sleeve transfixing the approximate mid point of said spar and allowing said sleeve to receive said boom.

9. The winged sailing craft of claim 8, wherein said universal joint connection allowing tilt about an axis parallel to said foot up to 50 degrees to the left or the right of vertical whilst supporting said boom approximately horizontally above said body; and said universal joint connection additionally allowing said spar tilt generally backwards but not forwards due to the interference of said foot with said body; and said universal joint connection additionally allowing the foot to swing substantially to the left or right of the longitudinal axis of the body.

10. The winged sailing craft of claim 9, wherein stays are connected between said masts and said spar to provide moment resistance of said wings hinging about said boom; and additionally ensuring that said spar bisects said angle between the wings whilst allowing variation in said angle between said wings.

11. The winged sailing craft of claim 10, wherein said stays joining said masts may alter said angle between the wings by passing the stays through pulleys at each end of said spar to form a loop from said stays; the midpoint of said loop being defined when both wings are horizontal and the spare is vertical; and said midpoint is connected to a shaped track fitted between said sleeve and said foot against the forwardly directed said of said spar; said track providing a means of deflecting said midpoint form the shortest path causing adjustment in the effective length of said stays as said midpoint is moved down the track thus preserving tension in the stays and causing the angle between the wings to reduce form approximately 180 degrees to approximately 90 degrees.

12. The winged sailing craft of claim 11, wherein a means is provided of moving and fixing said midpoint of the stays and thereby rapidly altering the angle between the wings or temporarily locking the angle between said wings.

13. The winged sailing craft of claim 12, wherein said body of the craft comprises a planing hull made of light weight materials and of sufficient volume to float the weight of the craft and crew.

14. The winged sailing craft of claim 13, wherein a centerboard extends below the hull to project into the water for receiving lateral force exerted by the water over which the hull is propelled.

15. The winged sailing craft of claim 12, wherein the outboard end of each wing having a float flexibly and pivotally attached by a strut projecting essentially at right angles to the approximate plane of the wings.

16. The winged sailing craft of claim 12, wherein the outboard end of each wing having a hydrofoil and float flexibly and pivotally attached projecting essentially at right angles to the approximate plane of said respective wing.

17. The winged sailing craft of claim 8, wherein a bearing section encases said boom to facilitate the axially sliding of the boom within said sleeve and of allowing pivotal connection of the masts to said boom.

* * * * *